United States Patent
Matsumura et al.

(10) Patent No.: US 8,526,141 B2
(45) Date of Patent: Sep. 3, 2013

(54) MAGNETIC DISK DEVICE AND GUIDE MEMBER FOR GUIDING A FLEXIBLE WIRING BOARD

(75) Inventors: Satoshi Matsumura, Kanagawa (JP); Takao Suzuki, Kanagawa (JP); Tomoki Hiramatsu, Kanagawa (JP); Kohji Takahashi, Kanagawa (JP)

(73) Assignee: HGST Netherlands B.V., Amsterdam (NL)

(*) Notice: Subject to any disclaimer, the term of this patent is extended or adjusted under 35 U.S.C. 154(b) by 266 days.

(21) Appl. No.: 12/967,043

(22) Filed: Dec. 13, 2010

(65) Prior Publication Data

US 2011/0141627 A1    Jun. 16, 2011

(30) Foreign Application Priority Data

Dec. 14, 2009  (JP) ................. 2009-282769

(51) Int. Cl.
*G11B 5/55* (2006.01)
(52) U.S. Cl.
USPC ...................... 360/264.2; 360/265.7
(58) Field of Classification Search
USPC .......... 360/264.2, 264.1, 265.7, 265.9, 266.3, 360/245.8, 245.9
See application file for complete search history.

(56) References Cited

U.S. PATENT DOCUMENTS

| | | | | |
|---|---|---|---|---|
| 7,787,219 B2 * | 8/2010 | Chan et al. | ................ | 360/265.7 |
| 7,961,436 B1 * | 6/2011 | Huang et al. | ................ | 360/264.2 |
| 8,130,472 B2 * | 3/2012 | Tanizawa et al. | ................ | 360/264.2 |
| 8,144,431 B2 * | 3/2012 | Chang et al. | ................ | 360/264.2 |
| 2003/0147180 A1 * | 8/2003 | Rosner et al. | ................ | 360/264.2 |
| 2004/0240119 A1 * | 12/2004 | Nakamura et al. | ................ | 360/264.2 |
| 2005/0018357 A1 * | 1/2005 | Hashi et al. | ................ | 360/264.2 |
| 2005/0254176 A1 * | 11/2005 | McReynolds et al. | ................ | 360/264.2 |
| 2008/0151429 A1 | 6/2008 | Tanizawa et al. | | |
| 2008/0180851 A1 | 7/2008 | Hong et al. | | |
| 2008/0180854 A1 * | 7/2008 | Chang et al. | ................ | 360/264.2 |
| 2009/0046391 A1 * | 2/2009 | Wu et al. | ................ | 360/264.2 |
| 2009/0244782 A1 | 10/2009 | Kagawa | | |
| 2009/0268417 A1 | 10/2009 | Kagawa | | |
| 2010/0123976 A1 * | 5/2010 | Freeman et al. | ................ | 360/264.2 |

FOREIGN PATENT DOCUMENTS

| | | |
|---|---|---|
| JP | 2003/224954 | 8/2003 |
| JP | 2003/224955 | 8/2003 |
| JP | 2004/288297 | 10/2004 |
| JP | 2006/344272 | 12/2006 |
| JP | 2008/159096 | 7/2008 |
| JP | 2008/186573 | 8/2008 |
| JP | 2008/305454 | 12/2008 |
| JP | 2009/238271 | 10/2009 |
| WO | WO 2008/111176 | 9/2008 |

* cited by examiner

*Primary Examiner* — Jefferson Evans

(57) ABSTRACT

A disk drive comprising a guide member configured to guide a strip-shaped flexible wiring board, wherein the strip-shaped flexible wiring board has one end attached to a side portion of a carriage that is rotatably supported, in such a way that another end thereof is oriented toward a mounting position. A U-shaped component of the guide member comprises a pair of edge components and is formed into a U-shape, wherein the U-shaped component is inserted between two projecting components comprising a front-side projecting component and a rear-side projecting component which are arranged to a front and a rear portion of the carriage respectively and are provided on a side portion of the carriage, and the pair of edge components come into contact with the two projecting components, respectively, wherein the U-shaped components is elastically deformed in such a way that the pair of edge components come closer together.

20 Claims, 14 Drawing Sheets

MAGNETIC DISK DEVICE AND GUIDE MEMBER FOR GUIDING A FLEXIBLE WIRING BOARD

CROSS-REFERENCE TO RELATED APPLICATION

This application claims priority from the Japanese Patent Application No. 2009-282769, filed Dec. 14, 2009, the disclosure of which is incorporated herein in its entirety by reference.

TECHNICAL FIELD

Embodiments of the present technology relate to a magnetic disk device and a guide member, and in particular relates to a structure for a guide member for guiding a strip-shaped flexible wiring board which is attached to the side portion of a carriage.

BACKGROUND

Disk drives, including magnetic disk drives, are increasingly prevalent in modern technology. Modern technology is also becoming increasingly smaller and thinner. There is a need to make enclosures for magnetic disk devices even thinner as laptop computers and the like become more compact. One impediment to the thinning of the enclosure is the band supporting the strip-shaped flexible wiring board which is attached to the side portion of the carriage.

SUMMARY

A disk drive comprising a guide member configured to guide a strip-shaped flexible wiring board, wherein the strip-shaped flexible wiring board has one end attached to a side portion of a carriage that is rotatably supported, in such a way that another end thereof is oriented toward a mounting position. A U-shaped component of the guide member which comprises a pair of edge components and is formed into a U-shape, wherein the U-shaped component is inserted between two projecting components comprising a front-side projecting component and a rear-side projecting component which are arranged to a front and a rear portion of the carriage respectively and are provided on a side portion of the carriage, and the pair of edge components come into contact with the two projecting component, respectively, wherein the U-shaped component is elastically deformed in such a way that the pair of edge components come closer together.

DESCRIPTION OF THE DRAWINGS

The accompanying drawings, which are incorporated in and form a part of this specification, illustrate embodiments of the present technology and, together with the description, serve to explain the embodiments of the present technology.

Figure 1:
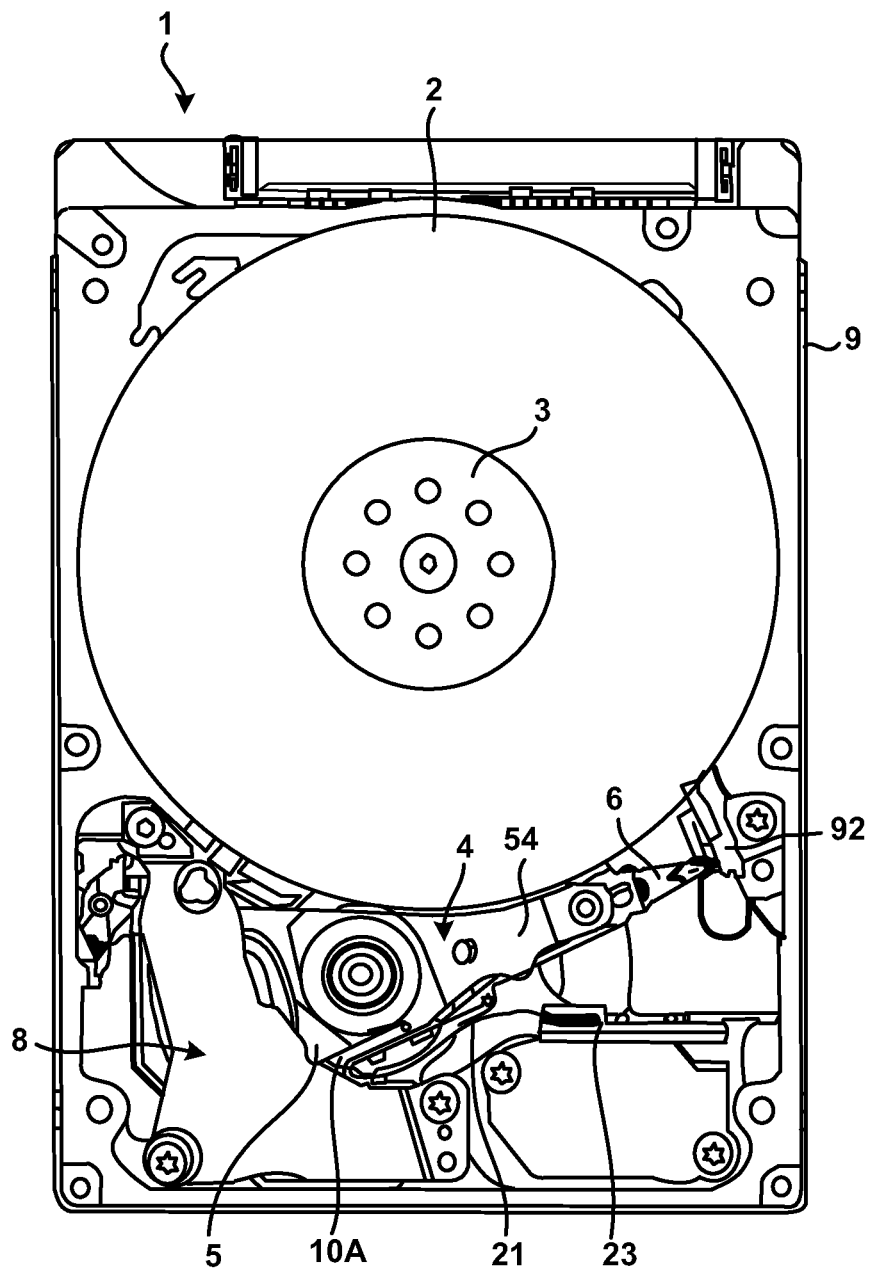
FIG. 1 is a block diagram of a plan view of the magnetic disk device in accordance with an embodiment of the present technology.

The drawings referred to in this description should not be understood as being drawn to scale except if specifically noted.

DESCRIPTION OF EMBODIMENTS

Reference will now be made in detail to the alternative embodiments of the present technology. While the technology will be described in conjunction with the alternative embodiments, it will be understood that they are not intended to limit the technology to these embodiments. On the contrary, the technology is intended to cover alternatives, modifications and equivalents, which may be included within the spirit and scope of the technology as defined by the appended claims.

Furthermore, in the following description of embodiments of the present technology, numerous specific details are set forth in order to provide a thorough understanding of the present technology. However, it should be noted that embodiments of the present technology may be practiced without these specific details. In other instances, well known methods, procedures, and components have not been described in detail as not to unnecessarily obscure embodiments of the present technology. Throughout the drawings, like components are denoted by like reference numerals, and repetitive descriptions are omitted for clarity of explanation if not necessary.

Description of Embodiments of the Present Technology for Magnetic Disk Device and Guide Member for Guiding a Flexible Wiring Board The magnetic disk device, in various embodiments of the present technology, comprises a carriage, a strip-shaped flexible wiring board, and a guide member. The carriage is rotatably supported, and has an assembly including a magnetic head disposed at the front side and a coil disposed at the rear side. The flexible wiring board has one end attached to the side portion of the carriage and is electrically connected to the magnetic head and the coil. The guide member guides the flexible wiring board which extends to the rear from the side portion of the carriage in such a way that the other end of said flexible wiring board is oriented toward the mounting position. Two projecting components which are arranged to the front and rear are provided on the side portion of the carriage. The guide component includes: a U-shaped component which includes a pair of edge components and is formed into a U-shape; and an arm component which comes into contact with the flexible wiring board from the rear and is narrower in width than the flexible wiring board. The U-shaped component is inserted between the two projecting components and the pair of edge components come into contact with the two projecting components, respectively, when the U-shaped component is elastically deformed in such a way that the pair of edge components come closer together.

Furthermore, the guide member according to the present technology guides the strip-shaped flexible wiring board, which has one end attached to the side portion of the carriage that is rotatably supported, in such a way that the other end of said flexible wiring board is oriented toward the mounting position. The guide member has a U-shaped component which includes a pair of edge components and is formed into a U-shape, and an arm component which comes into contact with the flexible wiring board from the rear and is narrower in width than the flexible wiring board. The U-shaped component is inserted between the two projecting components which are arranged to the front and rear and provided on the side portion of the carriage, and the pair of edge components come into contact with the two projecting components, respectively, when the U-shaped component is elastically deformed in such a way that the pair of edge components come closer together.

According to the present technology described above, the U-shaped component of the guide member is inserted between the two projecting components, and the pair of edge components come into contact with the two projecting components, respectively, when the U-shaped component is elastically deformed in such a way that the pair of edge components come closer together, and therefore it is possible to suppress rattling of the guide member.

Figure 2:
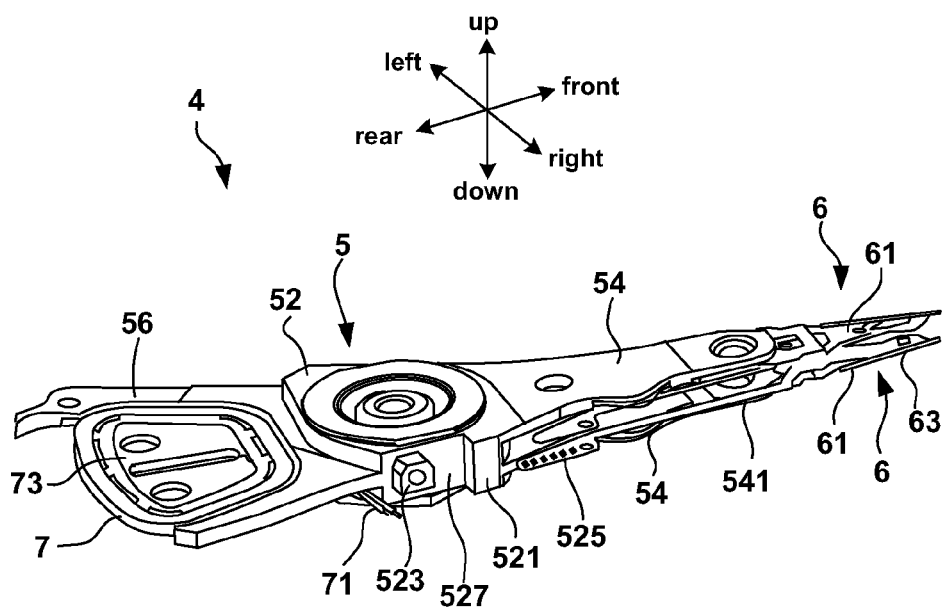
FIG. 2 is a block diagram of an oblique view of the head stack assembly in accordance with an embodiment of the present technology.
Figure 3:
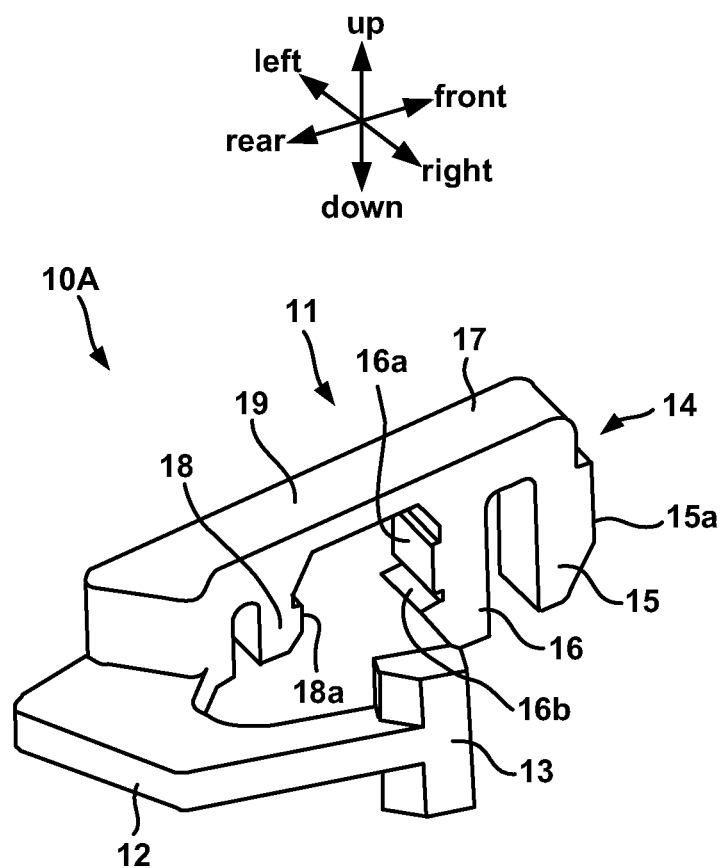
FIG. 3 is a block diagram of an oblique view of the guide member in accordance with an embodiment of the present technology.
Figure 4:
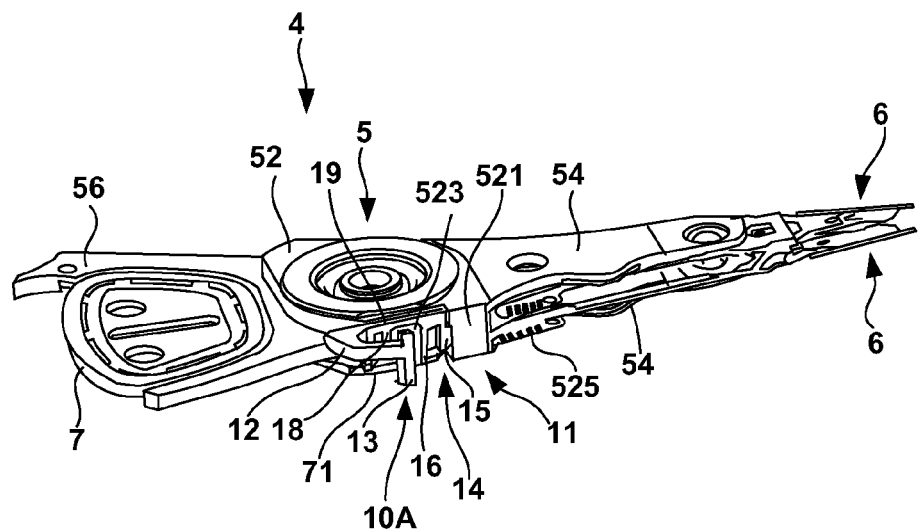
FIG. 4 is a block diagram of an oblique view of the head stack assembly on which the guide member is mounted, in accordance with an embodiment of the present technology.
Figure 5:
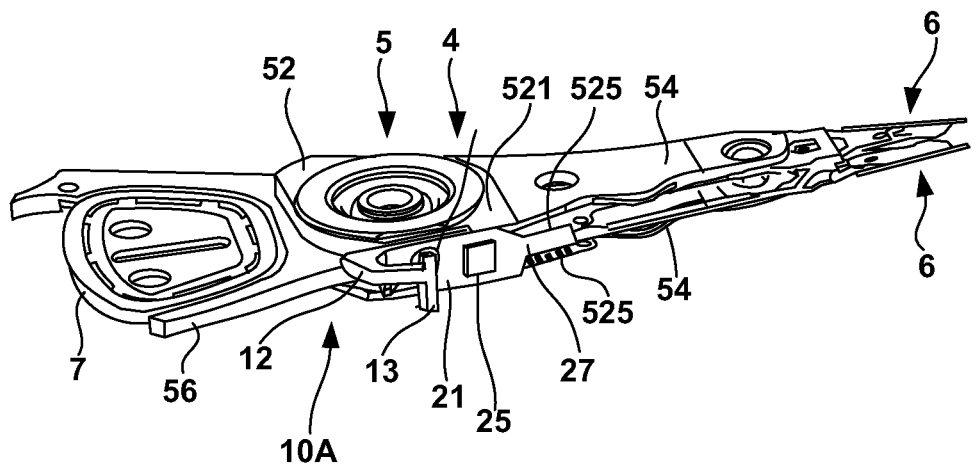
FIG. 5 is a block diagram of an oblique view of the head stack assembly on which the guide member and flexible wiring board are mounted, in accordance with an embodiment of the present technology.
Figure 6:
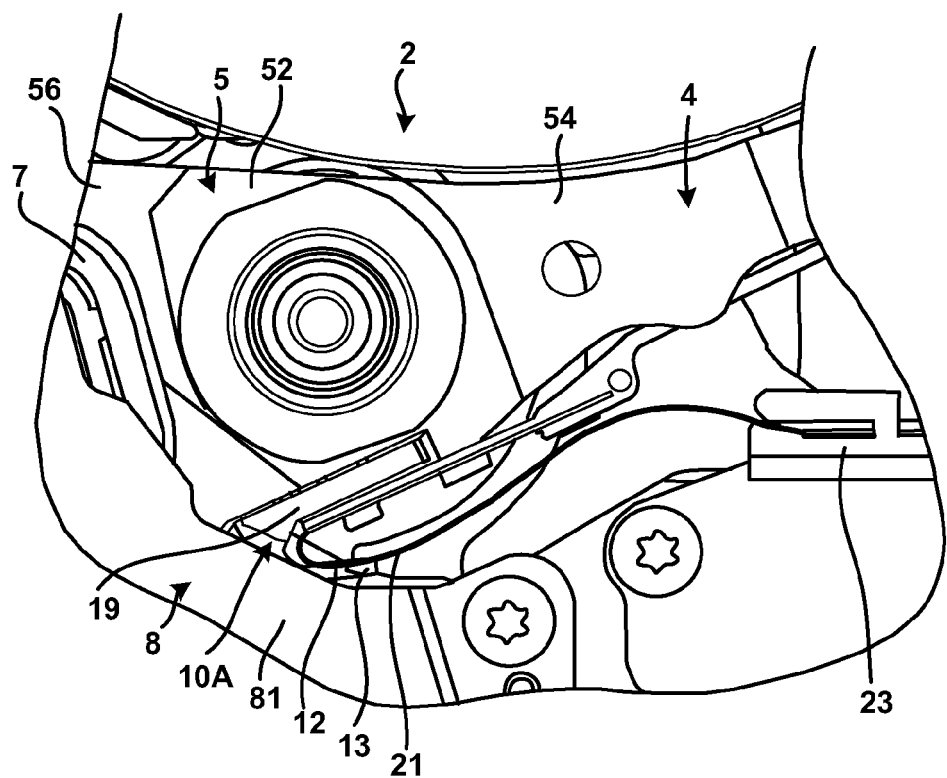
FIG. 6 is a block diagram of an enlarged view of the main parts in FIG. 1 in accordance with an embodiment of the present technology.
Figure 7:
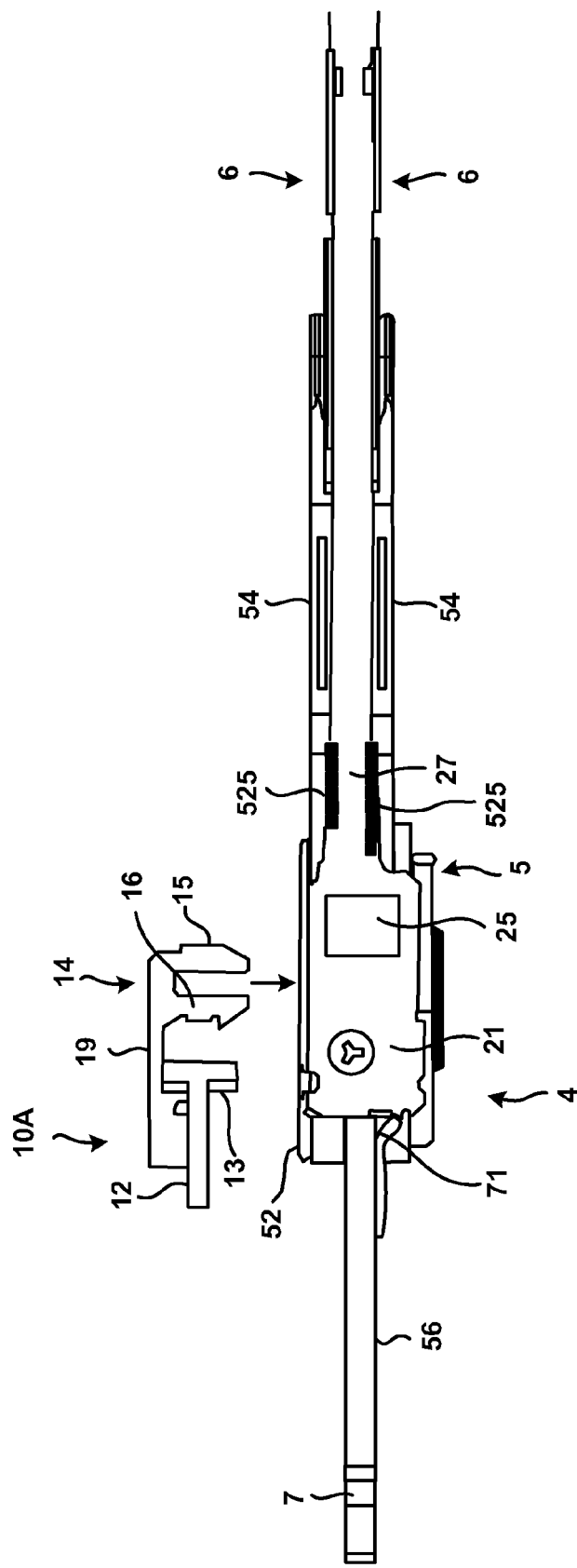
FIG. 7 is a block diagram of a side view of the head stack assembly showing the procedure for mounting the guide member and flexible wiring board, in accordance with an embodiment of the present technology.
Figure 12:
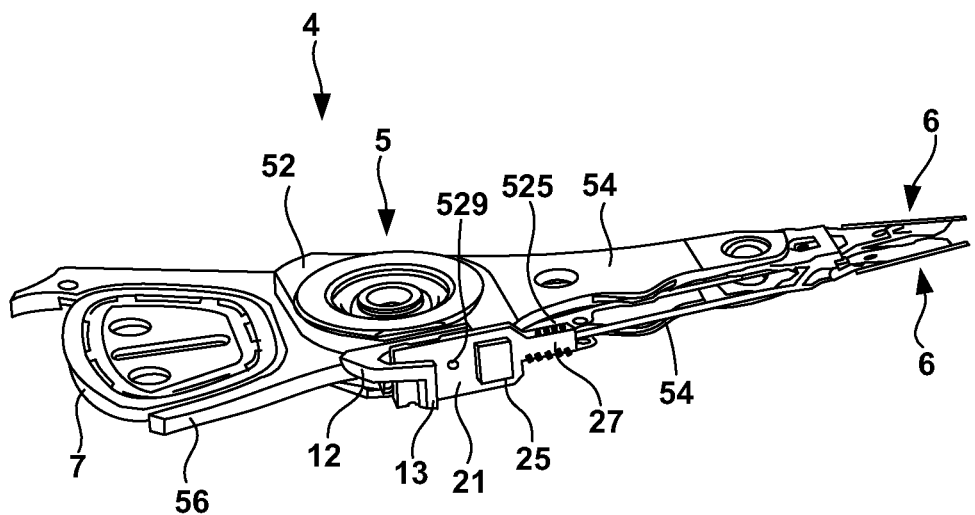
FIG. 12 is a block diagram of an oblique view of the head stack assembly on which the guide member and flexible wiring board are mounted, in accordance with an embodiment of the present technology.

FIG. 1 is a plan view of a magnetic disk device 1. The top cover has been omitted from the figure. FIG. 2 is an oblique view of a head stack assembly 4. FIG. 3 is an oblique view of a guide member 10A. FIG. 4 is an oblique view of the head stack assembly 4 on which the guide member 10A is mounted. FIG. 5 is an oblique view of the head stack assembly 4 on which the guide member 10A and a flexible wiring board 21 are mounted. FIG. 6 is an enlarged view of the main portions in FIG. 1. FIG. 7 is a side view of the head stack assembly 4 showing the procedure for mounting the guide member 10A and flexible wiring board 21. It should be noted that only one end of the flexible wiring board 21 is shown in FIGS. 5, 7 and 12 for the sake of the description.

As shown in FIG. 1, a magnetic disk 2 and the head stack assembly 4 are housed inside an enclosure 9 of the magnetic disk device 1. The magnetic disk 2 is mounted on a spindle motor 3 which is provided at the bottom of the enclosure 9. The head stack assembly 4 is rotatably supported next to the magnetic disk 2. Furthermore, a voice coil motor 8 for rotating the head stack assembly 4 is provided inside the enclosure 9.

As shown in FIG. 2, the head stack assembly 4 comprises: a carriage 5 which is rotatably supported; a head gimbal assembly 6 which is disposed in front of the carriage 5; and a coil 7 which is disposed behind the carriage 5. The head gimbal assembly 6 includes a magnetic head 63 for reading and writing data, and suspension 61 for supporting said magnetic head. The coil 7 forms a portion of the voice coil motor 8.

The carriage 5 is made of a metallic material such as stainless steel, and includes an axial support component 52 which is supported in a turnable manner, a plurality of planar arm components 54 which extend forward from the axial support component 52, and a coil support component 56 which splits to the left and right from the axial support component 52 and extends to the rear. The head gimbal assembly 6 is mounted at the tip ends of the arm components 54. A wiring component 541 which extends to the front and rear is disposed on the right-hand portion of the arms 54. The front end of the wiring component 541 is connected to the wiring of the head gimbal assembly 6, while the rear end of the wiring component 541 is connected to terminal sets 525 which are provided at the base end of the arm components 54. The coil 7 is mounted between the branches of the coil support component 56. A stiffener 73 which provides reinforcement is disposed inside the coil 7. Wiring 71 which is joined to the coil 7 extends up to the region of the right-hand portion of the axial support component 52.

Two projecting components 521, 523 which project further to the right than a side surface 527 are arranged to the front and rear, and are provided on the right-hand portion of the axial support component 52 of the carriage 5. The front-side projecting component 521 is disposed to the front of the side surface 527. The rear-side projecting component 523 is surrounded by the side surface 527. A groove in which the side surface 527 forms the bottom surface is formed between the two projecting components 521, 523. The rear-side projecting component 523 is formed as a roughly quadrangular prism, with the two top corners being chamfered. Furthermore, a screw hole is provided in the rear-side projecting component 523.

As shown in FIG. 3, the guide member 10A is made of an insulating resin material, and it comprises: a mounting component 11 which is mounted on the right-hand portion of the axial support component 52 of the carriage 5; an arm component 12 which extends in such a way as to be bent back from the rear end of the mounting component 11; and a widened portion 13 which is provided at the tip end of the arm component 12.

A U-shaped component 14 which is shaped into a U-shape is provided at the front of the mounting component 11. The U-shaped component 14 includes a pair of edge components 15, 16 which are arranged to the front and rear and extend vertically, and a base end 17 which links the top ends of said edge components; the lower end of the U-shaped component 14 is open. The edge components 15, 16 are able to elastically deform in the direction approaching each other. An abutment surface 15a which projects forward is formed part way along the front-side edge component 15, while an abutment surface 16a which projects to the rear is formed part way along the rear-side edge portion 16. Furthermore, a retaining component 16b which projects to the rear is formed at the lower end of the rear-side edge portion 16.

An auxiliary edge component 18 which is positioned to the rear of the U-shaped component 14 and extends vertically, and a linking edge component 19 which extends to the front and rear and links the U-shaped component 14 and the auxiliary edge component 18, are provided at the rear of the mounting component 11. The auxiliary edge component 18 is formed to be shorter than the edge components 15, 16 of the U-shaped component 14. An abutment surface 18a which projects forward is formed at the lower end of the auxiliary edge component 18. The linking edge component 19 extends to the front and rear in such a way as to form a continuation of the base end 17 of the U-shaped component 14.

The arm component 12 has a shape which extends to the rear from the rear end of the mounting component 11, bends part way along, and then extends forward, so the overall shape is like that of a hook. Furthermore, the arm component 12 extends as far as to the right of the auxiliary edge component 18, and the widened portion 13 which extends vertically is provided at the tip end thereof.

As shown in FIG. 4, the guide member 10A is mounted on the right-hand portion of the axial support component 52 of the carriage 5. The U-shaped component 14 of the mounting component 11 is inserted from the top downward between the two projecting components 521, 523 which are provided on the right-hand portion of the axial support component 52. Tapers are formed at the tip ends of the respective edge components 15, 16 of the U-shaped component 14, and when the edge components 15, 16 are inserted between the projecting components 521, 523, said edge components are subjected to a force in the direction which brings them closer together, and causes elastic deformation thereof.

Once the edge components 15, 16 have been fully inserted, they come into contact with the projecting components 521, 523, respectively. To be more specific, the abutment surface 15a of the front-side edge 15 (see FIG. 3) comes into contact with the rear surface of the front-side projecting component 521, and the abutment surface 16a of the rear-side edge portion 16 (see FIG. 3) comes into contact with the front surface of the rear-side projecting component 523. In this case, the gap between the abutment surfaces 15a, 16a is somewhat greater than the gap between the projecting components 521, 523, and therefore the edge components 15, 16 come into contact with the projecting components 521, 523, respectively, while still undergoing elastic deformation in the direction which brings them closer together. That is to say, the edge components 15, 16 demonstrate elastic return force in the direction which pushes the projecting components 521, 523 apart, and the projecting components 521, 523 demonstrate a reaction force which holds in the edge components 15, 16. This means that the guide member 10A is firmly mounted on the carriage 5 and rattling is suppressed.

The retaining component 16b which is formed at the lower end of the rear-side edge portion 16 is disposed below the rear-side projecting component 523, and when an external force which urges the U-shaped component 14 upward is applied, said retaining component is designed to catch on the lower surface of the rear-side projecting component 523.

The auxiliary edge component 18 is positioned to the rear of the rear-side projecting component 523, and the abutment surface 18a which is formed on the auxiliary edge component 18 (see FIG. 3) comes into contact with the rear surface of the rear-side projecting component 523. The auxiliary edge component 18 and the edge component 16 of the U-shaped component 14 hold the rear-side projecting component 523 there between, using the elastic return force of the edge component 16. Furthermore, the wiring 71 of the coil 7 is disposed below the auxiliary edge component 18. That is to say, space for the passage of the wiring 71 is ensured by making the auxiliary edge component 18 short.

The linking edge component 19 is positioned above the rear-side projecting component 523, and the lower surface of the linking edge component 19 comes into contact with the upper surface of the rear-side projecting component 523. In this way, the edge component 16 of the U-shaped component 14, the auxiliary edge component 18, and the linking edge component 19 come into contact with the front surface, rear surface and upper surface, respectively, of the rear-side projecting component 523, and therefore the guide member 10A is accurately positioned.

The arm component 12 is disposed in alignment with the coil support component 56 of the carriage 5. The arm component 12 is of a similar thickness to the coil support component 56 of the carriage 5, and said arm component extends in a plane which is perpendicular to the axis of rotation of the axial support component 52. The arm component 12 is provided in a similar position in the vertical direction to the coil support component 56, and is disposed adjacent to the coil support component 56. That is to say, the arm component 12 is disposed in such a way as to lie within the path of the coil support component 56 when the carriage 5 has rotated. Furthermore, the widened portion 13 is positioned in the range of extension of the rear-side projecting component 523 in the direction of extension thereof.

As shown in FIG. 5, one end of the strip-shaped flexible wiring board 21, comprising an FPC (flexible printed circuit), is attached to the right-hand portion of the axial support component 52 of the carriage 5. The flexible wiring board 21 is held by a screw in the rear-side projecting component 523 of the axial support component 52 (see FIG. 2). The terminal set 27 which extends forward in an elongated manner is provided at one end of the flexible wiring board 21. This terminal set 27 is inserted between the terminal sets 525 provided on the arm components 54 of the carriage 5, and corresponding terminals are then connected by soldering. The wiring contained in the flexible wiring board 21 is thereby electrically connected to the magnetic head 63. The wiring contained in the flexible wiring board 21 is also connected to the wiring 71 (see FIG. 2), which extends from the coil 7, in the region of the rear-side projecting component 523 of the axial support component 52.

Furthermore, an IC chip 25 is mounted at one end of the flexible wiring board 21. This IC chip 25 is a head IC which includes a read amplifier for amplifying reproduction signals read by means of the magnetic head 63, and a write driver for generating recording signals which are read by means of the magnetic head 63. The IC chip 25 lies opposite and between the front-side projecting component 521 of the axial support component 52 and the flexible wiring board 21. Any heat produced by the IC chip 25 is therefore absorbed from the front-side projecting component 521 into the carriage 5 as a whole. It should be noted that a groove is formed between the two projecting components 521, 523 (see FIG. 2), and therefore the heat which is absorbed by the front-side projecting component 521 from the IC chip 25 is not readily transferred to the rear-side projecting component 523 in which the screw hole is formed. The guide member 10A is fixed to the carriage 5 using this groove for suppressing heat conduction.

The guide member 10A guides the flexible wiring board 21 which extends to the rear from the right-hand portion of the axial support component 52 of the carriage 5 by means of the arm component 12 and the widened portion 13, in such a way that the other end of said flexible wiring board is facing forward. As shown in FIGS. 1 and 6, a connection unit 23 for producing a connection with a circuit board outside the enclosure 9 is provided in a position inside the enclosure 9 close to the arm components 54 of the carriage 5, and the other end of the flexible wiring board 21 is attached to the connection unit 23. The arm component 12 and widened portion 13 of the guide member 10A make contact from the rear side of the flexible wiring board 21, whereby the flexible wiring board 21 is supported in a bent-back state in such a way that the other end thereof faces the connection unit 23.

The arm component 12 and widened portion 13 are formed to be narrower than the flexible wiring board 21, and they come into contact with the flexible wiring board 21 in such a way as not to jut out from the flexible wiring board 21 in the width direction, so there is no impediment to thinning the enclosure 9. Furthermore, the widened portion 13 provided at the tip end of the arm component 12 extends further in the width direction of the flexible wiring board 21 than the arm 12, thereby stably supporting the flexible wiring board 21.

In addition, as shown in FIG. 6, the arm component 12 can be inserted together with the coil 7 and coil support component 56 into the space formed by the pair of yokes 81, which form part of the voice coil motor 8. To be more specific, part of the arm component 12 is inserted into the space formed by the pair of yokes 81 which are disposed in a vertically facing manner when the magnetic head 63 in the head stack assembly 4 is in a position removed outside of the magnetic disk 2 (see FIG. 1). In this way, the rotation of the carriage 5 is not impeded by the arm component 12 because the arm component 12 can be inserted into the space formed by the pair of yokes 81. This therefore improves the degree of freedom in designing the carriage 5 and the surrounding area.

It should be noted that FIG. 4 which was described above shows the head stack assembly 4 on which the guide member 10A is mounted, but when actual assembly takes place, the flexible wiring board 21 is attached to the right-hand portion of the axial support component 52 of the carriage 5, after which the guide member 10A is mounted, as shown in FIG. 7. After the widened portion 13 of the guide member 10A has been positioned on the extension of the rear-side projecting component 523 in which the screw hole is formed, and the guide member 10A has been mounted on the axial support component 52, it is difficult to screw the flexible wiring board 21 into place, and therefore the assembly procedure shown in FIG. 7 is followed.

Furthermore, the groove which is formed between the two projecting components 521, 523 of the axial support component 52 (see FIG. 2) is covered by the flexible wiring board 21 when the flexible wiring board 21 is attached to the right-hand portion of the axial support component 52 of the carriage 5, and therefore a hole running vertically is formed in this section. The U-shaped component 14 of the guide member 10A is inserted from the top downward into this hole.

Figure 8A:
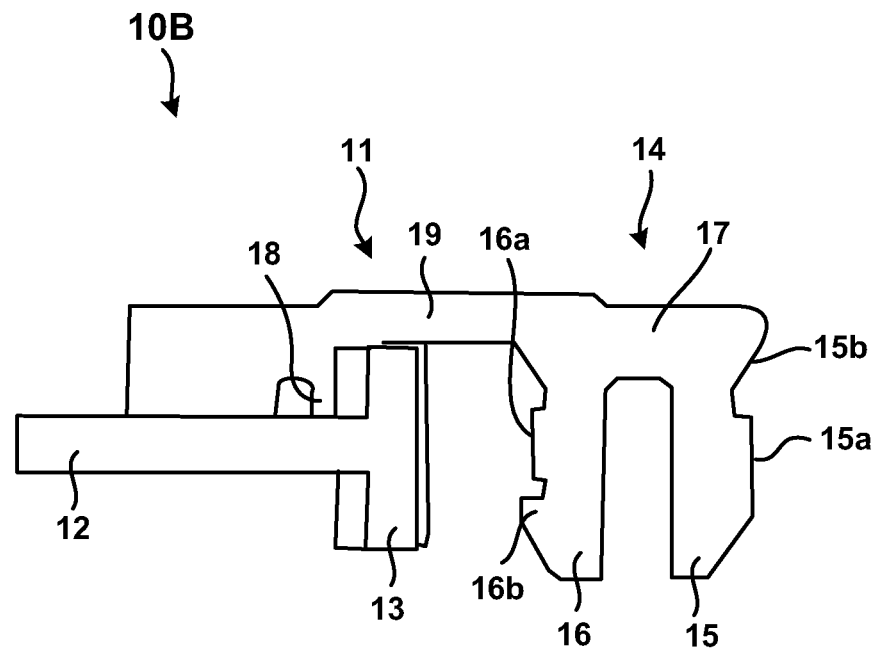
FIG. 8A is a block diagram of a side view of the guide member according to a variant example in accordance with an embodiment of the present technology.
Figure 8B:
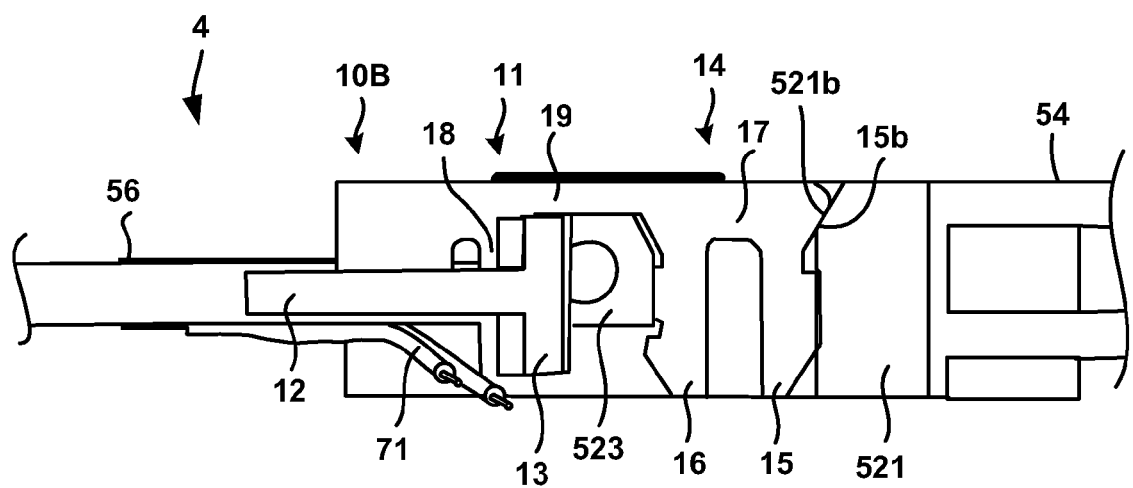
FIG. 8B is a block diagram of a side view of the head stack assembly on which the guide member is mounted, according to a variant example in accordance with an embodiment of the present technology.

A variant example of the first mode of embodiment will be described. FIG. 8A is a side view of a guide member 10B according to this variant example. FIG. 8B is a side view of the head stack assembly 4 on which is mounted the guide member 10B according to this variant example. It should be noted that components which were also present in the mode of embodiment described above bear the same numbers and they will not be described in detail here.

In this variant example, a tapered surface 15b which is inclined downward is formed at the upper end of the front-side edge component 15 of the U-shaped component 14 included in the guide member 10B. This tapered surface 15b is inclined in such a way that the normal direction thereto runs downward and forward. Furthermore, a tapered surface 521b which is inclined upward is formed at the upper end of the front-side projecting component 521 of the axial support component 52 of the carriage 5. This tapered surface 521b is inclined in such a way that the normal direction thereto runs upward and rearward. When the U-shaped component 14 is then inserted between the two projecting components 521, 523, the tapered surface 15b of the front-side edge component 15 and the tapered surface 521b of the front-side projecting component 521 come into abutment. Consequently the tapered surfaces 15b, 521b are in abutment and therefore rotation is prevented even if an external force which acts to lift the rear side is exerted on the mounting component 11 of the guide member 10B, with the rear-side projecting component 523 as the pivot point.

Figure 9:
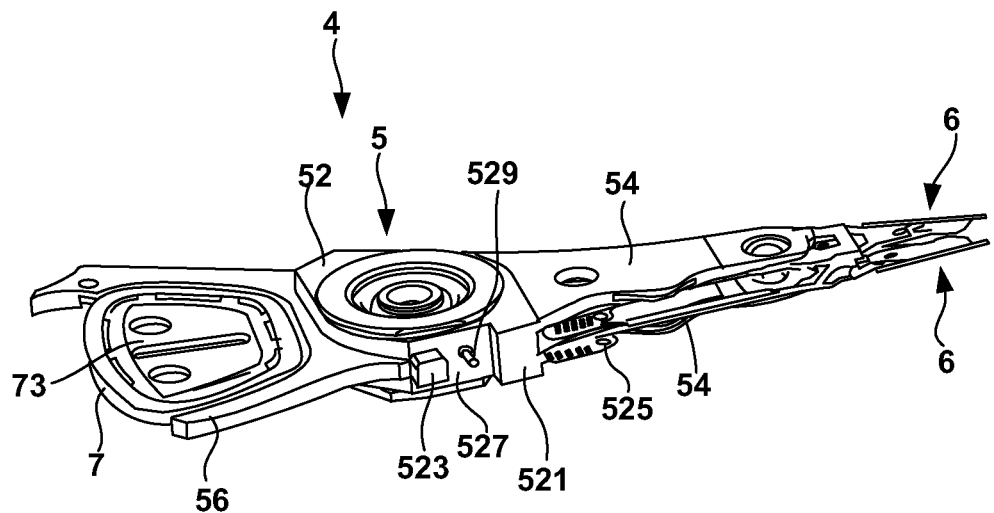
FIG. 9 is a block diagram of an oblique view of the head stack assembly in accordance with an embodiment of the present technology.
Figure 10:
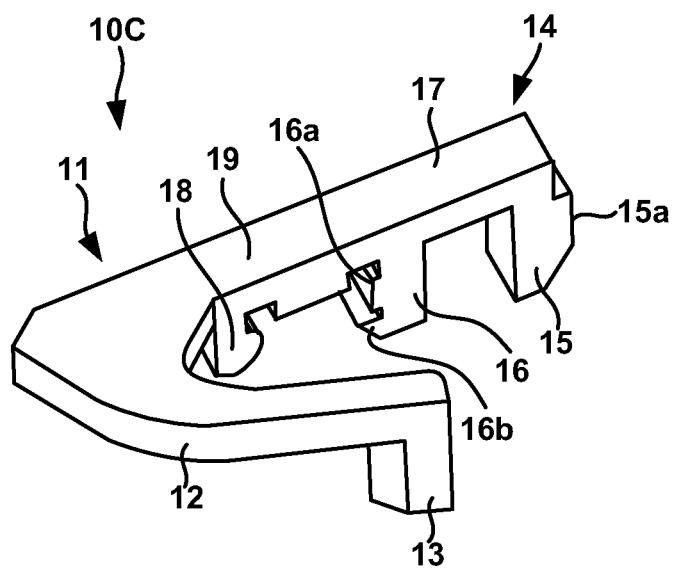
FIG. 10 is a block diagram of an oblique view of the guide member in accordance with an embodiment of the present technology.
Figure 11:
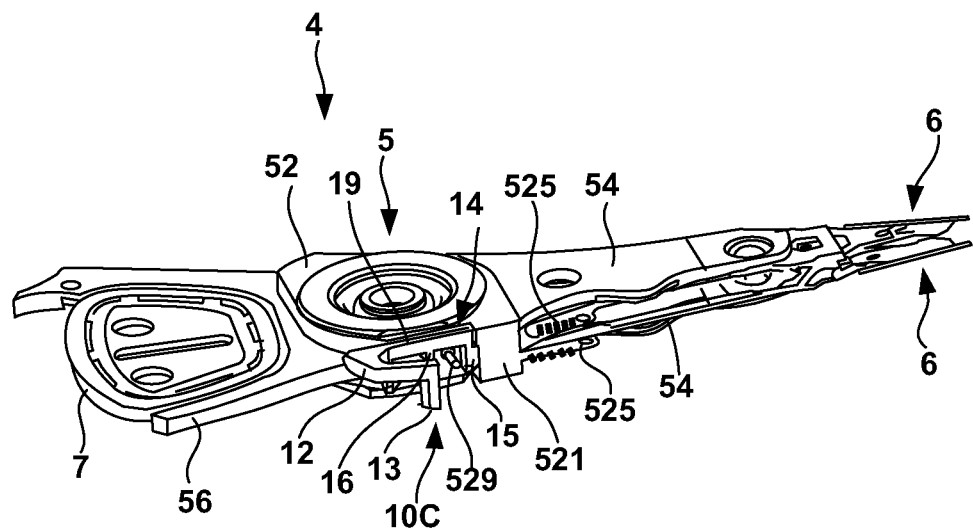
FIG. 11 is a block diagram of an oblique view of the head stack assembly on which the guide member is mounted, in accordance with an embodiment of the present technology.

FIG. 9 is an oblique view of the head stack assembly 4. FIG. 10 is an oblique view of the guide member 10B. FIG. 11 is an oblique view of the head stack assembly 4 on which the guide member 10B is mounted. FIG. 12 is an oblique view of the head stack assembly 4 on which the guide member 10B and flexible wiring board 21 are mounted. It should be noted that components which were also present in the mode of embodiment described above bear the same numbers and they will not be described in detail here.

As shown in FIG. 9, a pin 529 projecting from the side surface 527 which forms the bottom surface of the groove is provided between the two projecting components 521, 523 on the right-hand portion of the axial support component 52 of the carriage 5.

As shown in FIG. 10, the arm component 12 of a guide member 10C is provided on the upper portion in such a way as to form a continuation of the base end 17 and linking edge component 19 of the mounting component 11. The vertical position of the arm component 12 is therefore different from that of the coil support component 56 of the carriage 5. Furthermore, the widened portion 13 extends downward from the tip end of the arm component 12.

As shown in FIG. 11, when the U-shaped component 14 of the guide member 10C is inserted between the two projecting components 521, 523 of the axial support component 52, the pin 529 which is provided therebetween is inserted between the edge components 15, 16 of the U-shaped component 14.

As shown in FIG. 12, the pin 529 projects to the opposite side through a through-hole formed in the flexible wiring board 21, and the projecting section is soldered to the flexible wiring board 21.

Modes of embodiment of the present invention have been described above, but the present invention is not limited to these modes of embodiment, and a person skilled in the art may of course make various modifications thereto.

Figure 13:
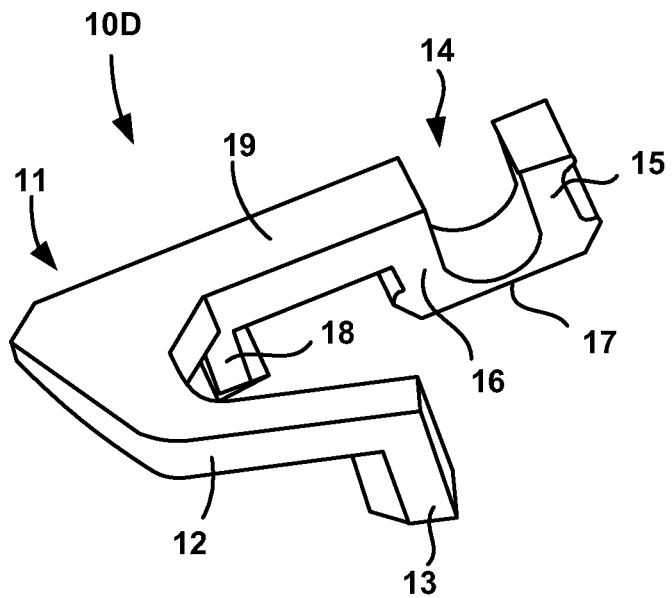
FIG. 13 is a block diagram of an oblique view of the guide member in accordance with an embodiment of the present technology.

For example, the lower ends of the edge components 15, 16 of the U-shaped component 14 may be linked by the base end 17 so that the upper side of the U-shaped component 14 is open, as with the guide member 10D according to a third mode of embodiment which is shown in FIG. 13. This kind of guide member 10D is mounted on the axial support component 52 of the carriage 5 shown in FIG. 2, which was described above.

The foregoing descriptions of specific embodiments of the present technology have been presented for purposes of illustration and description. They are not intended to be exhaustive or to limit the technology to the precise forms disclosed, and many modifications and variations are possible in light of the above teaching. The embodiments described herein were chosen and described in order to best explain the principles of the technology and its practical application, to thereby enable others skilled in the art to best utilize the technology and various embodiments with various modifications as are suited to the particular use contemplated. It is intended that the scope of the technology be defined by the claims appended hereto and their equivalents.

What is claimed is:

1. A disk device, comprising:
a carriage which is rotatably supported, and has an assembly comprising a magnetic head disposed at a front side and a coil disposed at a rear side;
a strip-shaped flexible wiring board which has one end attached to a side portion of said carriage and is electrically connected to said magnetic head and said coil;
a guide member for guiding said flexible wiring board which extends from a rear side to a side portion of said carriage in such a way that an other end of said flexible wiring board is oriented toward a mounting position;
two projecting components comprising a front-side projecting component and a rear-side projecting component which are arranged to a front and a rear portion of said carriage respectively and are provided on a side portion of said carriage; and
said guide member comprises:
a U-shaped component which comprises a pair of edge components and is formed into a U-shape, wherein said U-shaped component is inserted between said two projecting components and said pair of edge components come into contact with said two projecting components, respectively, wherein said U-shaped component is elastically deformed in such a way that said pair of edge components come closer together; and
an arm component which comes into contact with said flexible wiring board from a rear side and is narrower in width than said flexible wiring board.

2. The disk device of claim 1, wherein a retaining component which catches on said rear-side projecting component is provided at a tip end in a direction of insertion of a rear-side edge portion of said U-shaped component.

3. The disk device of claim 1, comprising an auxiliary edge component that sandwiches said rear-side projecting component with a rear-side edge portion of said U-shaped component.

4. The disk device of claim 3, which is provided with a linking edge component which links said rear-side edge portion of said U-shaped component and said auxiliary edge component, and which comes into contact with said rear-side projecting component.

5. The disk device of claim 3, wherein said auxiliary edge component is shorter than said rear-side edge portion of said U-shaped component.

6. The disk device of claim 1, wherein a position of said arm component is aligned along a common axis with said coil.

7. The disk device of claim 1, which is provided with a pair of yokes which are arranged opposite each other and allow said insertion of said coil into a space between said pair of yokes.

8. The disk device of claim 1, wherein a widened portion which extends in a widthwise direction of said flexible wiring board is provided at a tip end of said arm component.

9. The disk device of claim 1, wherein a tip end of said arm component is positioned on an extension of said rear-side projecting component.

10. The disk device of claim 1, wherein said front-side projecting component and an IC chip mounted on said flexible wiring board lie opposite each other with said flexible wiring board between said front-side projecting component and said IC chip.

11. The disk device of claim 1, wherein said flexible wiring board is retained on said rear-side projecting component by a screw.

12. The disk device of claim 1, wherein a pin which is attached to said flexible wiring board through an inner portion of said U-shaped component is provided between said two projecting components.

13. The disk device of claim 1, wherein a tapered surface which is inclined in a direction of insertion and comes into contact with said front-side projecting component is formed at a base end in said direction of insertion of a front-side edge portion of said U-shaped component.

14. A disk device, comprising:
a carriage;
a flexible wiring board;
a guide member for guiding said flexible wiring board which extends from a rear side to a side portion of said carriage in such a way that an other end of said flexible wiring board is oriented toward a mounting position;
two projecting components comprising a front-side projecting component and a rear-side projecting component which are arranged to a front and a rear portion of said carriage respectively and are provided on a side portion of said carriage; and
said guide member comprises:
a U-shaped component which comprises a pair of edge components and is formed into a U-shape, wherein said U-shaped component is inserted between said two projecting components and said pair of edge components come into contact with said two projecting components, respectively, wherein said U-shaped component is elastically deformed in such a way that said pair of edge components come closer together; and
an arm component which comes into contact with said flexible wiring board from a rear side and is narrower in width than said flexible wiring board.

15. The disk device of claim 14, wherein a retaining component which catches on said rear-side projecting component is provided at a tip end in a direction of insertion of a rear-side edge portion of said U-shaped component.

16. The disk device of claim 14, comprising an auxiliary edge component that sandwiches said rear-side projecting component with a rear-side edge portion of said U-shaped component.

17. The disk device of claim 16, which is provided with a linking edge component which links said rear-side edge portion of said U-shaped component and said auxiliary edge component, and which comes into contact with said rear-side projecting component.

18. The disk device of claim 16, wherein said auxiliary edge component is shorter than said rear-side edge portion of said U-shaped component.

19. The disk device of claim 14, wherein a widened portion which extends in a widthwise direction of said flexible wiring board is provided at a tip end of said arm component.

20. The disk device of claim 14, wherein a tip end of said arm component is positioned on an extension of said rear-side projecting component.

* * * * *